US012306348B2

(12) United States Patent
Aßmann

(10) Patent No.: US 12,306,348 B2
(45) Date of Patent: May 20, 2025

(54) METHODS AND DEVICES FOR IDENTIFYING PEAKS IN HISTOGRAMS

(71) Applicant: STMicroelectronics (Research & Development) Limited, Marlow (GB)

(72) Inventor: Andreas Aßmann, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 326 days.

(21) Appl. No.: 17/697,784

(22) Filed: Mar. 17, 2022

(65) Prior Publication Data
US 2023/0296739 A1    Sep. 21, 2023

(51) Int. Cl.
*G06F 11/30*     (2006.01)
*G01S 7/48*      (2006.01)
*G01S 7/4865*    (2020.01)
*G01S 17/10*     (2020.01)

(52) U.S. Cl.
CPC .......... *G01S 7/4865* (2013.01); *G01S 7/4808* (2013.01); *G01S 17/10* (2013.01)

(58) Field of Classification Search
CPC .................................................. G01S 7/4865
See application file for complete search history.

(56) References Cited

U.S. PATENT DOCUMENTS 10,502,832 B2 * 12/2019 Tehrani Niknejad ... G01S 17/42
2021/0165083 A1 *  6/2021 Fine ..................... H10F 39/1538

OTHER PUBLICATIONS

Wei, "Efficient Histogram-Based Sliding Window," 2010 IEEE Computer Society Conference on Computer Vision and Pattern Recognition, Jun. 13-18, 2010, 8 Pages. (Year: 2010).*
Ogawa, T. et al., "TOF-LIDAR Signal Processing using the CFAR Detector," Advances in Radio Science Open Access Proceedings, Adv. Radio Sci, 14, 2016, 7 pages.
Wei, Yichen, "Efficient Histogram-Based Sliding Window," 2010 IEEE Computer Society Conference on Computer Vision and Pattern Recognition, Jun. 13-18, 2010, 8 pages.

* cited by examiner

*Primary Examiner* — Phuong Huynh
(74) *Attorney, Agent, or Firm* — Slater Matsil, LLP

(57) ABSTRACT

A single-pass method for identifying peaks in a time of flight histogram, the single-pass method including conducting an ordered comparison of each bin with an adaptive threshold until finding a bin that exceeds the adaptive threshold; enabling peak tracking in response to finding the bin that exceeds the adaptive threshold; in response to enabling peak tracking, continuing the ordered comparison of each bin with the adaptive threshold until finding a bin that falls below the adaptive threshold; and in response to finding the bin that falls below the adaptive threshold, marking a peak location between the bin exceeding the adaptive threshold and the bin that falls below the adaptive threshold.

20 Claims, 14 Drawing Sheets

METHODS AND DEVICES FOR IDENTIFYING PEAKS IN HISTOGRAMS

TECHNICAL FIELD

The present invention relates generally to systems and methods to identify peaks in time of flight histogram data.

BACKGROUND

Light Detection and Ranging ("LiDAR") devices and operations, as well as other imaging approaches, may function by emitting photons into an environment and determining the length of time it takes for photons to be reflected back. Knowing the speed of the photons, the distance between a LiDAR system and an object in its field of view may be determined using Time of Flight (ToF) of the photons between emission and detection. A photon-count histogram may be generated that group photon-detection events into time ranges referred to as bins. Photon-count peaks in the histogram data can be used to identify objects at distances from a system that correspond to the time range for bins where peaks are located. However, LiDAR systems may comprise numerous pixels so peak detection can impose heavy costs on a system.

SUMMARY

In accordance with an embodiment, a method to identify peaks in a histogram includes beginning an ordered comparison of each bin in the histogram with an adaptive threshold until finding a bin exceeding the adaptive threshold, each bin of the histogram representing a photon count corresponding to a distance from a light-ranging system; continuing the ordered comparison after finding the bin exceeding the adaptive threshold until finding a bin falling below the adaptive threshold; determining a width by identifying a number of bins between the bin exceeding the adaptive threshold and the bin falling below the adaptive threshold; finding the width exceeds a width threshold; marking a peak location between the bin exceeding the adaptive threshold and the bin falling below the adaptive threshold; and continuing the ordered comparison until each bin has been compared with the adaptive threshold one time.

In accordance with an embodiment, a single-pass method for identifying peaks in a time of flight histogram, the single-pass method including: conducting an ordered comparison of each bin with an adaptive threshold until finding a bin that exceeds the adaptive threshold; enabling peak tracking in response to finding the bin that exceeds the adaptive threshold; in response to enabling peak tracking, continuing the ordered comparison of each bin with the adaptive threshold until finding a bin that falls below the adaptive threshold; and in response to finding the bin that falls below the adaptive threshold, marking a peak location between the bin exceeding the adaptive threshold and the bin that falls below the adaptive threshold.

In accordance with an embodiment, a light-ranging system including: an optical source configured to emit optical pulses for light-ranging; an optical receiver configured to detect photons; a time to digital converter in communication with the optical receiver and configured to output times of flight of photons detected by the optical receiver; and a processor in communication with the time to digital converter to receive times of flight of photons detected by the optical receiver and store them in a time of flight histogram; a memory storing an instruction set that, when executed, causes the processor to begin an ordered comparison of each bin in the time of flight histogram with an adaptive threshold until a bin exceeding the adaptive threshold is found, each bin of the times of flight histogram representing a photon count corresponding to a distance from the light-ranging system; continue the ordered comparison after finding the bin exceeding the adaptive threshold until a bin falling below the adaptive threshold is found; determine a width by identifying a number of bins between the bin exceeding the adaptive threshold and the bin falling below the adaptive threshold; find the width exceeds a width threshold; mark a peak location between the bin exceeding the adaptive threshold and the bin falling below the adaptive threshold; and continue the ordered comparison until each bin has been compared with the adaptive threshold one time.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
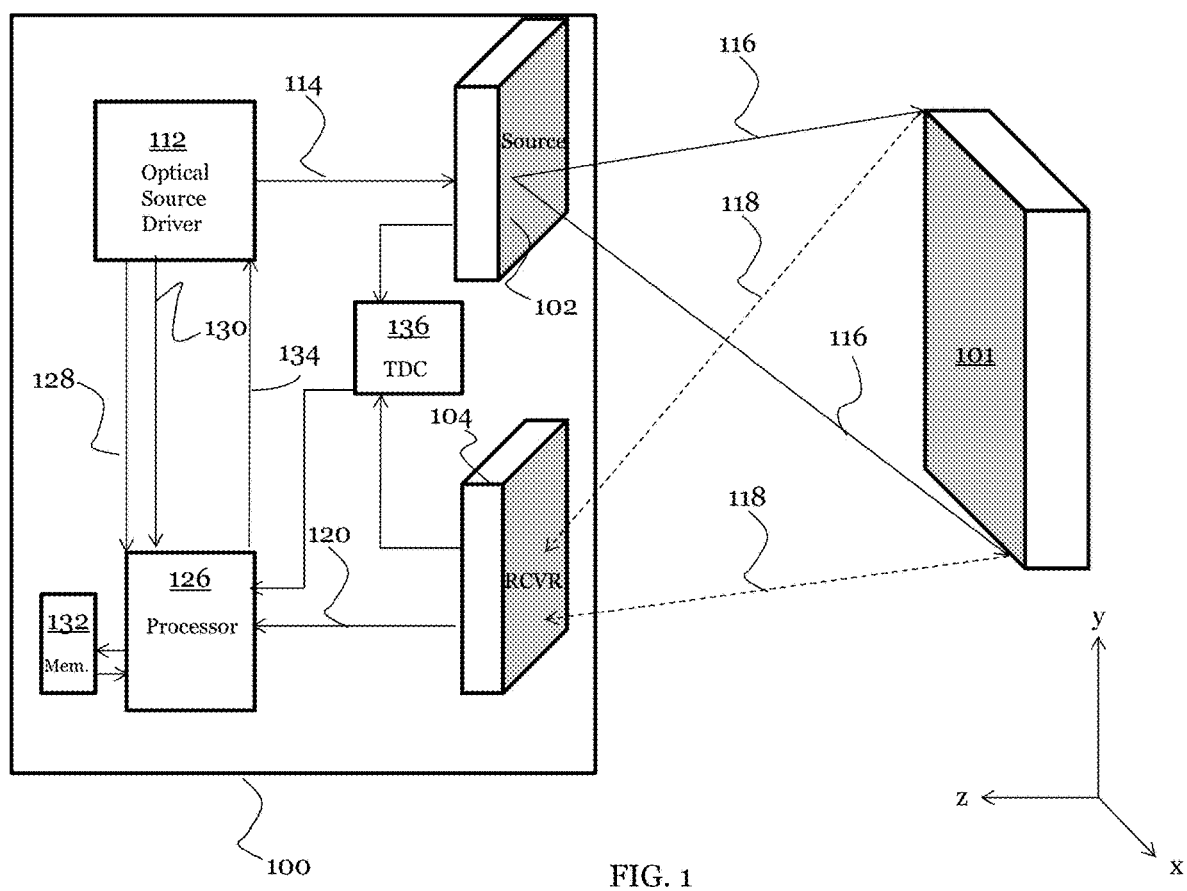
FIG. 1 illustrates a light-ranging system.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments. Unless otherwise noting elements referred to with the same numeric identifier in the figures may represent the same component.

LiDAR systems detect objects in their field of view by projecting optical pulses into the field of view. Reflections from objects in the field of view are sensed, and locations of objects in the field of view determined based on times between emission and detection. To accomplish this, photon counts are generated for time periods referred to as bins. Collectively, the bins form a photo-count histogram. Peaks in the photo count histogram can be corresponded to objects in the field of view of a LiDAR system. Similar photon-count histograms may be utilized for other types of 3D sensing and single photon avalanche diode ("SPAD") array imaging).

As will be appreciated such systems and methods have a wide array of applications including, but not limited to, multi-zone auto-focus assistance, post process depth of field, computations imaging, Augmented Reality, Virtual Reality, autonomous robotics, gesture recognition, facial recognition, in-cabin monitoring, and many more.

Many application may be constrained by power and size limitation (such as mobile applications) while object-detection performance benefits from full histogram information. Known approaches for peak detection require sweeping histogram data multiple times to perform multiple processing routines on the data. Some example routines include cross-talk compensation, pulse segmentation, and pulse fitting. Further, as demands for increased resolution and definition increase, so to do the processing resources needed to evaluate the photon count histograms. In other words, the more pixels an imaging system utilizes, the greater processing burden needed to identify peaks in the photon-count histograms. For example, a single histogram may comprise 144, or more, bins. And, multiple data sweeps (cross-talk, pulse segmentation, and pulse fitting) are performed for each pixel. This can quickly add up to burden the resources of a LiDAR system.

Known solutions to accommodate the data demands required for full histogram processing all have downsides. Off-chip computation can increase I/O complexity, require large memory resources, and slow down computation for the required data transfers. On chip computation solutions are highly complex, also require large memories, and require multiple loops for histogram elements. Further, multiple discrete algorithms are needed for corner cases and applications.

Methods and systems that can find peaks with one iteration can cut down the processing burden for LiDAR and improve a LiDAR system.

FIG. 1 illustrates a light-ranging system.

An object 101 is disposed in a three dimensional environment positioned in front of the light-ranging system 100. The light-ranging system wo may be used to determine the proximity of the object 101 to the light-ranging system 100. The object 101 is provided for explanatory purposes. The three-dimensional environment may include additional objects of various shapes or sizes disposed at varying distances from the light-ranging system 100, and the light-ranging system 100 may determine the proximity of the various objects in the three-dimensional environment for imaging the three-dimensional environment. The object 101 may comprise multiple surfaces at various distances from the light-ranging system 100, and the light-ranging system 100 may determine the depth of the different surfaces of the object 101. The light-ranging system 100 may simultaneously determine the proximity of additional objects in the three dimensional environment to generate a three-dimensional image of the three-dimensional environment. The three-dimensional image may comprise a depth map of the three dimensional environment.

The light-ranging system 100 may comprise an optical source 102, which may be referred to as an optical transmitter, and an optical receiver 104.

Figure 2A:
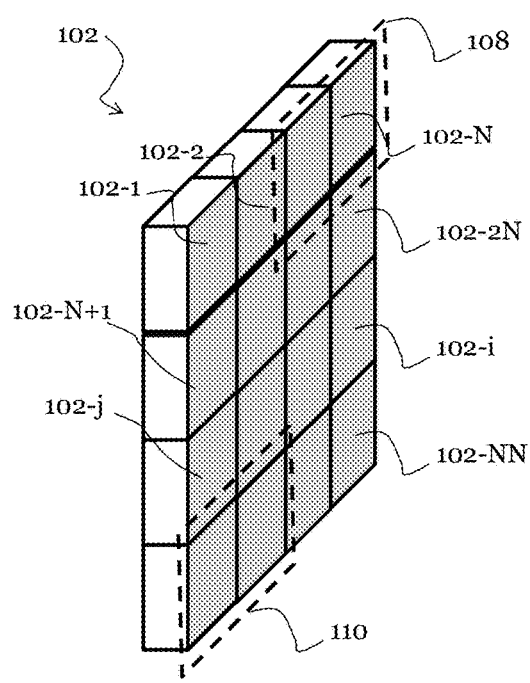
FIG. 2A shows an enlarged view of an optical source.

FIG. 2A shows an enlarged view of an optical source 102;

As depicted in FIG. 2A, the optical source 102 may comprise a plurality of pixels 102-1 to 102-NN arranged as an array. Although the example of FIG. 2A illustrates the optical source and plurality of pixels 102-1 to 102-NN as being arranged in a square N×N array, other array shapes (e.g. ellipsoidal arrays or circular-shaped arrays) may be possible in other embodiments. Each of the plurality of pixels 102-1 to 102-NN may comprise one or more infrared sources, modulated light emitting diodes (LEDs), semiconductor lasers, or combinations thereof, although other types of optical sources may be possible. It should also be appreciated, that in various embodiments, the optical source may comprise a single point source rather than an array of pixels. In various embodiments, the optical source may comprise semiconductor lasers, vertical-cavity surface-emitting lasers (VCSELs), quantum well lasers, quantum cascade lasers, interband cascade lasers, or the like.

The plurality of pixels 102-1 to 102-NN may be configured to operate at the same wavelength. In other embodiments, however, the plurality of pixels 102-1 to 102-NN may operate at different wavelengths. For example, the group 108 of pixels and the group 110 of the plurality of pixels 102-1 to 102-NN may operate at different wavelengths. The plurality of pixels 102-1 to 102-NN may exhibit continuous wave (CW) operation, quasi-continuous wave (QCW) operation, or pulsed operation.

Referring back to FIG. 1, in various embodiments, the light-ranging system 100 may comprise an optical source driver 112. The operation of the optical source 102 may be controlled by the optical source driver 112. In various embodiments, the optical source driver may generate a drive current 114 that is capable of activating the optical source 102.

In various embodiments, the plurality of pixels 102-1 to 102-NN may be an addressable array. The plurality of pixels 102-1 to 102-NN may be individually addressable where an optical emitter 102-*i* (shown in FIG. 2A) of the plurality of pixels 102-1 to 102-NN is addressable independently of another emitter 102-*j* of the plurality of pixels 102-1 to 102-NN. The drive current 114 provided by the optical source driver 112 to the optical source 102 may cause an optical emitter 102-*i* to be activated (and thereby emit a photon or photon pulse), while another emitter 102-*j* is not activated (and thereby does not emit a photon). In various embodiments, the plurality of pixels 102-1 to 102-NN may be addressable as a group or cluster, where one group 108 of the plurality of pixels 102-1 to 102-NN is addressable independently of another group no of the plurality of pixels 102-1 to 102-NN. In various embodiments, the drive current 114 provided by the optical source driver 112 to the optical source 102 may cause the group 108 of the plurality of pixels 102-1 to 102-NN to be activated (and thereby emit a photon or photon pulse), while another group no of the plurality of pixels 102-1 to 102-NN is not activated (and thereby does not emit a photon). Using an array of pixels 102-1 to 102-NN that are individually addressable allows dynamically reconfiguration of an illumination pattern of the optical source 102 and/or an intensity level of each of the plurality of pixels 102-1 to 102-NN of the plurality of pixels 102-1 to 102-NN to adapt to various applications or environments. It should also be appreciated that all pixels may be simultaneously illuminated for projections.

Radiation (light) emanating from the optical source 102, collectively shown in FIG. 1 as incident radiation 116 using solid arrows, may be incident upon the object 101. The incident radiation 116 is reflected off the object 101 to produce reflected radiation 118. It is noted that although incident radiation 116 and reflected radiation 118 are represented in FIG. 1 by few arrows, all radiation incident on and reflected from the object 101 may be combined in one beam or cone of radiation. While some part of the incident radiation 116 may be scattered depending upon the surface features of the object 101, a significant part of the incident radiation 116 may be reflected, thereby producing the reflected radiation 118.

The optical receiver 104 may receive the reflected radiation 118 and generates an output signal 120 in response to the reflected radiation 118 striking the optical receiver 104. The output signal 120 may be a digital signal or an analog signal, depending on the circuitry of the optical receiver 104.

Figure 2B:
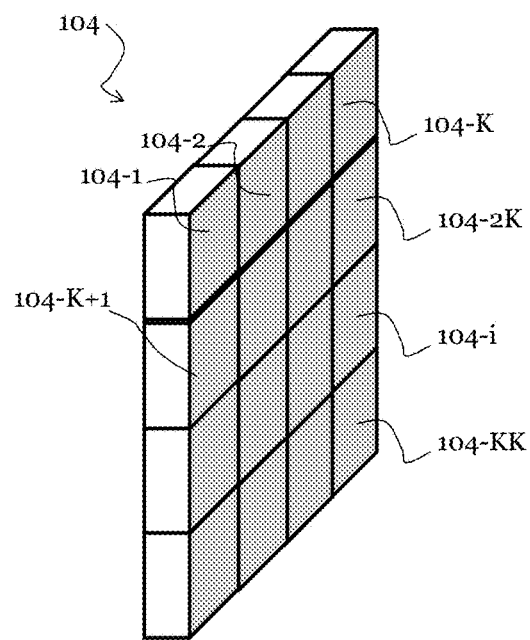
FIG. 2B shows an enlarged view of the optical receiver.

FIG. 2B shows an enlarged view of the optical receiver.

As depicted in FIG. 2B, the optical receiver 104 may comprise a plurality of light-sensitive pixels 104-1 to 104-KK. Although the example of FIG. 2B illustrates the light-sensitive pixels 104-1 to 104-KK as being arranged in a square K×K array, other array shapes (e.g. ellipsoidal arrays or circular-shaped arrays) may be possible in other embodiments. The intrinsic spatial resolution of the light-ranging system 100 may be determined by the resolution of the optical receiver 104. For example, since the light-sensitive pixels 104-1 to 104-KK in the embodiment of FIG. 2B are arranged as a K×K array, the intrinsic spatial resolution of the light-ranging system 100 may be a K×K image. It is noted that the output signal 120 may be expressed as a K×K matrix of measurements, or a 1×K² vector of measurements, with each entry of the matrix corresponding to the signal received from a respective pixel of the plurality of light-sensitive pixels 104-1 to 104-KK.

Figure 3:
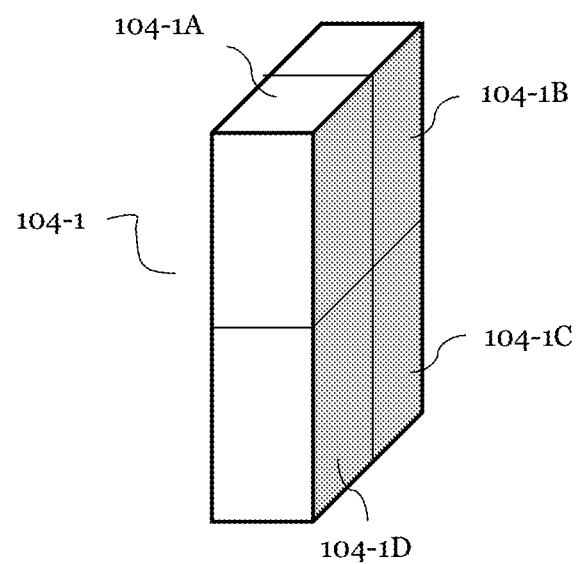
FIG. 3 depicts an embodiment of a light-sensitive pixel 104-1 of the plurality of light-sensitive pixels 104-1 to 104KK.

FIG. 3 depicts an embodiment of a light-sensitive pixel 104-1 of the plurality of light-sensitive pixels 104-1 to 104KK.

In various embodiments, a light-sensitive pixel 104-1 may comprise a plurality of individual light-detecting sensors 104-1A to 104-1D. This may allow light-sensitive pixels to detect more reflected radiation and improve the signal to noise ratio of the output signal 120. The individual light-detecting sensors 104-1A to 104-1D may be combined by an OR tree so light-sensitive pixel 104-1 captures measurements from the plurality of individual light-detecting sensors 104-1A to 104-1D. The individual light-detecting sensors 104-1A to 104-1D may comprise single-photon avalanche diodes (SPADs) photo diodes (PDs), avalanche photo diodes (APDs), or combinations thereof. In embodiments comprising SPADs, the availability of more than one light-detecting sensor may allow photon detection while one or more of the individual SPADs are recharging. In various embodiments, some or all of the plurality of light-sensitive pixels 104-1 to 104-KK may comprise a plurality of individual light-detecting sensors. While detecting photons, the individual light-detecting sensors of a radiation-sensing pixel may be firing at random but correlated to the arrival of photons onto the radiation pixel.

Although, light-sensitive pixel 104-1 is depicted with four individual light-detecting sensors 104-1A to 104-D arranged in a 2×2 array, it will be appreciated that light-sensitive pixel 104-1 may comprise any number of individual light-detecting sensors. In various embodiments, the light-sensitive pixel 104-1 may comprise a single light detecting sensor, a 4×4 array of individual light-detecting sensors, an 8×8 array of individual light-detecting sensors, a 16×16 array of individual light-detecting sensors or any other number of individual light-detecting sensors. In various embodiments, each pixel may comprise singe light-sensitive sensor.

As shown in FIG. 1, the light-ranging system 100 may further comprise a processor 126 configured to receive the output signal 120 and determine the proximity of the object 101 to the light-ranging system 100 based on the output signal 120. The processor 126 can additionally reconstruct three-dimensional images of the object 101 based on the output signal 120 as well as 2D intensity images related to reflective properties of surfaces in the scene.

The optical source driver 112 may be programmed to drive the plurality of pixels 102-1 to 102-NN to generate incident radiation pulses. The optical source driver 112 may receive a control signal 134 from the processor 126 that initiates the optical source driver 112. The control signal 134 may determine which of the plurality of pixels 102-1 to 102-NN are active and which are inactive. In embodiments where the optical source 102 comprises a single point source the drive current 114 may activate the optical source 102.

The radiation from the optical source 102 may illuminate the object 101 in a predetermined timing sequence or at predetermined timing intervals. The object 101 may reflect the incident radiation 116 and the arrival times of the pulses of reflected radiation 118 at the optical receiver 104 are proportional to twice the distance between the object 101 and the light-ranging system 100, based on the speed of light in the measurement medium or environment.

The optical source 102 may comprise semiconductor lasers (e.g. VCSELs), while the optical receiver 104 may comprise high speed photodetectors (e.g. SPADs). The optical receiver 104 may be configured to record at least one of arrival times, pulse shapes, or intensities of the pulses of reflected radiation 118. Reflected radiation 118 may arrive at different times at the optical receiver 104, depending on the respective distances between the different parts of the object 101 or other objects in the three-dimensional environment and the light-ranging system 100. The reflected radiation 118 may be detected synchronously with a timing signal 130 that is configured to cause the optical source driver 112 to generate incident radiation 116. The processor 126 may analyze the time-of-flight (ToF) between emission of incident radiation 116 travelling towards the object 101 and arrival of reflected radiation 118 received at the optical receiver 104 to determine the proximity of the object 101 of objects in the three-dimensional environment. A plurality of proximity measurements may be used to generate a comprehensive set of data to accurately determine both lateral spatial distances (e.g. in the x-y plane shown in FIG. 1) and depth (e.g. along the z-axis shown in FIG. 1) of the object or objects in the three-dimensional environment.

In various embodiments, photons counted at a light-sensitive pixel may be categorized based on ToF analysis to generate a histogram of estimated distances of the object or surface that reflected the radiation to the light-sensitive pixel. Conceptually, the ToF of a photon sensed at a light-sensitive pixel may be calculated and assigned to a bin that represents a distance. As additional photons are sensed during a measurement, they may be assigned to a bin. The various bins may accumulate a photon count and the distribution of photons in the various bins may be used to estimate the distance from the light-ranging system 100 of the reflective surface measured at the light-sensitive pixel. The photon-counting process may be a Poisson process.

In various embodiments, the light-ranging system 100 may comprise one or more time to digital converters. TDC 136 in communication with the optical source 102, the optical receiver 104, and the processor. The one or more TDCs 136 may measure the interval between the emission of incident radiation 116 from the optical source 102 and the arrival of reflected radiation 118 at the optical receiver 104 and provide it to the processor 126. In various embodiments, the processor 126 may comprise the TDC and the interval between emission and arrival may be calculated using a timing signal 130 to trigger the emission and the time of arrival.

Figure 4:
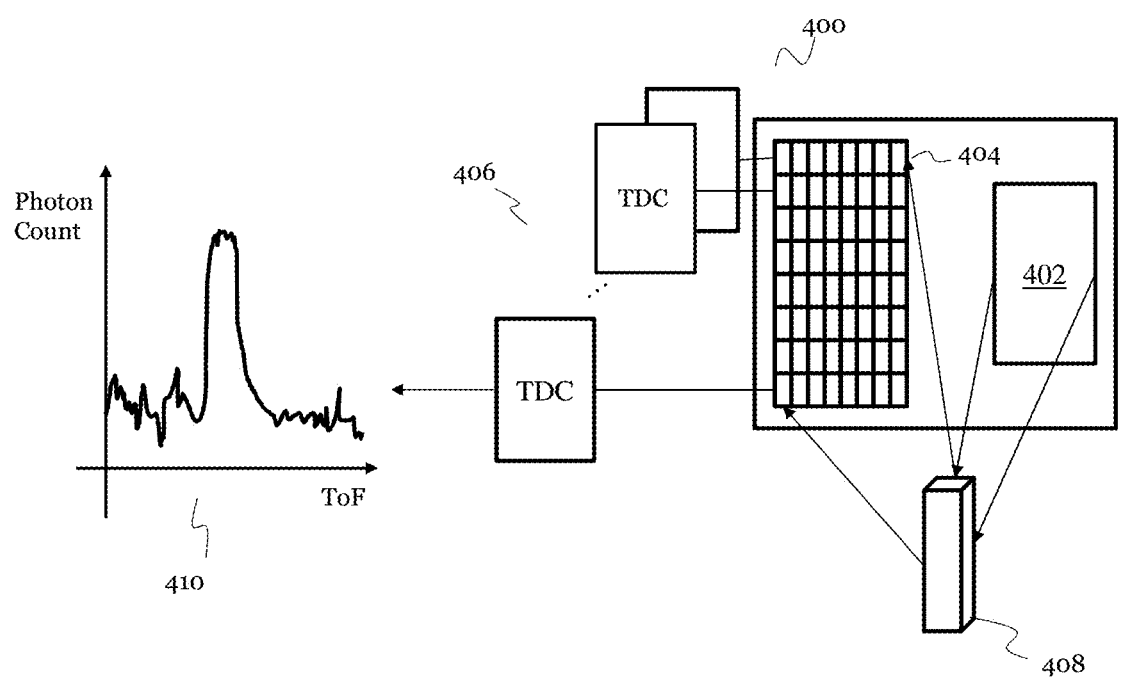
FIG. 4 illustrates a photon-count histogram generation for a pixel of a light ranging system in accordance with an embodiment.

FIG. 4 illustrates a photon-count histogram generation for a pixel of a light ranging system in accordance with an embodiment.

The light ranging system 400 may comprise and optical source 402 (such a VCSEL source or other optical source) and an optical receiver 404, which may comprise array of light sensitive pixels. The light ranging system 400 may further comprise one or more TDCs 406. The number of TDCs may vary from embodiment to embodiment and may depend on the number of light-sensitive pixels of the optical receiver 404. In various embodiments, the light ranging system 400 may comprise one TDC for each pixel. In various embodiment, the light ranging system 400 may comprise one TDC for each row, or column, of an array of light-sensitive pixels. As will be appreciated, there are multiple way to configure a TDC in relation to photon detection pixels to accumulate histogram data An optical pulse generated by the optical source may produce photons that are reflected from the object 408. As these photons are reflected back and hit the array of light sensitive pixels 404, they may trigger detection events that are transmitted to the TDCs 406. The TDCs will convert the arrival times of the photons into digital signals that are transmitted to a processor. Depending on when they arrive the, the processor (such as processor 126) may then assign them to a bin of a histogram 410. The histogram 410 may be accumulated over multiple samples where each sample comprises an optical pulse and the photon count builds on the count from the previous samples. The horizontal axis of the histogram 410 may represent the ToF of the photons. The vertical axis of the histogram 410 may represent the magnitude of the photon count accumulated over one or more samples.

Figure 5:
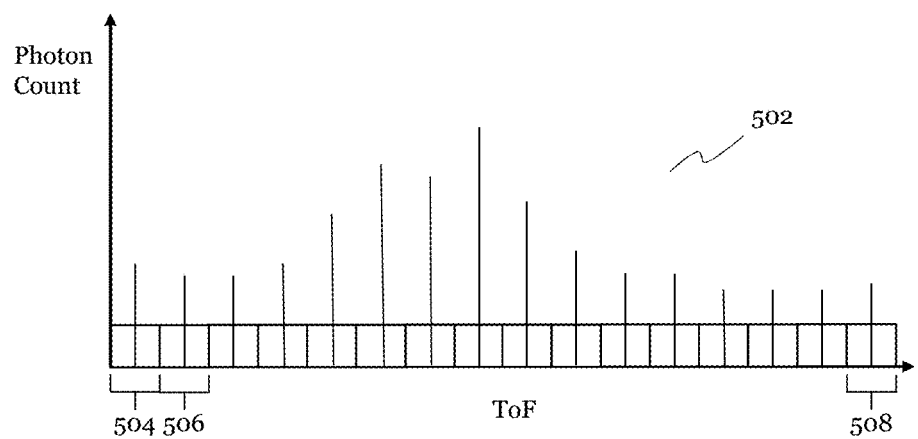
FIG. 5 depicts a histogram of photon count data in accordance with an embodiment

FIG. 5 depicts a histogram of photon count data in accordance with an embodiment.

The histogram may be divided into bins. Each bin may correspond to a range of ToF. Photons arriving at a light-sensitive pixel during a given time range may be counted in the corresponding bin. For example, a histogram may cover a time period of 144 nS and it may be divided into 144 bins. Each of the 144 bins may store a count of the photons detected during a 1 nS span. Photons detected between emission and 1 nS may be counted in the first bin. Photons detected between 1 nS and 2 nS may grouped in a second bin and so on. As mentioned, this count may be accumulated over multiple samples. Photons detected during the time period corresponding to first bin during a second sample may be added to the photon count for the first bin from the first sample. Due the relationship between distance and time given the constant speed of light, the bins may also be corresponded to distances from the light ranging system. The shorter the time lapse between emission of a light pulse and detection by an optical receiver light sensitive pixels 404 the shorter the distance between the light ranging system and object.

A histogram 502, may comprise a first bin 504, a second bin 506, continuing on to an Nth bin 508. The first bin 504 may accumulate as photons are detected during a first time range with respect to a pulse emission. The second bin 506 may accumulate as photons are detected during a second time range with respect to a pulse emission. An Nth bin 508 may accumulate as photons are detected during an Nth time range with respect to a pulse emission. Each bin may have a magnitude that corresponds to the photon count at that bin (the number of detection events sensed during the time range for that bin over one or more samples). This is represented by the vertical axis in FIG. 5. As will be appreciated, the number of bins, and the width (duration of the range) of the bins, and the time period ranged may all vary from embodiment to embodiment.

Identifying photon count peaks in a histogram can be used to identify the distance of objects from a light ranging system. Multiple objects may produce multiple peaks. Peak detection is thus an important factor for light ranging. Known approaches for peak detection require multiple processing sweeps through a histogram to distinguish peaks from noise or optical effects, identify potential peaks, and fit the peaks.

Figure 6:
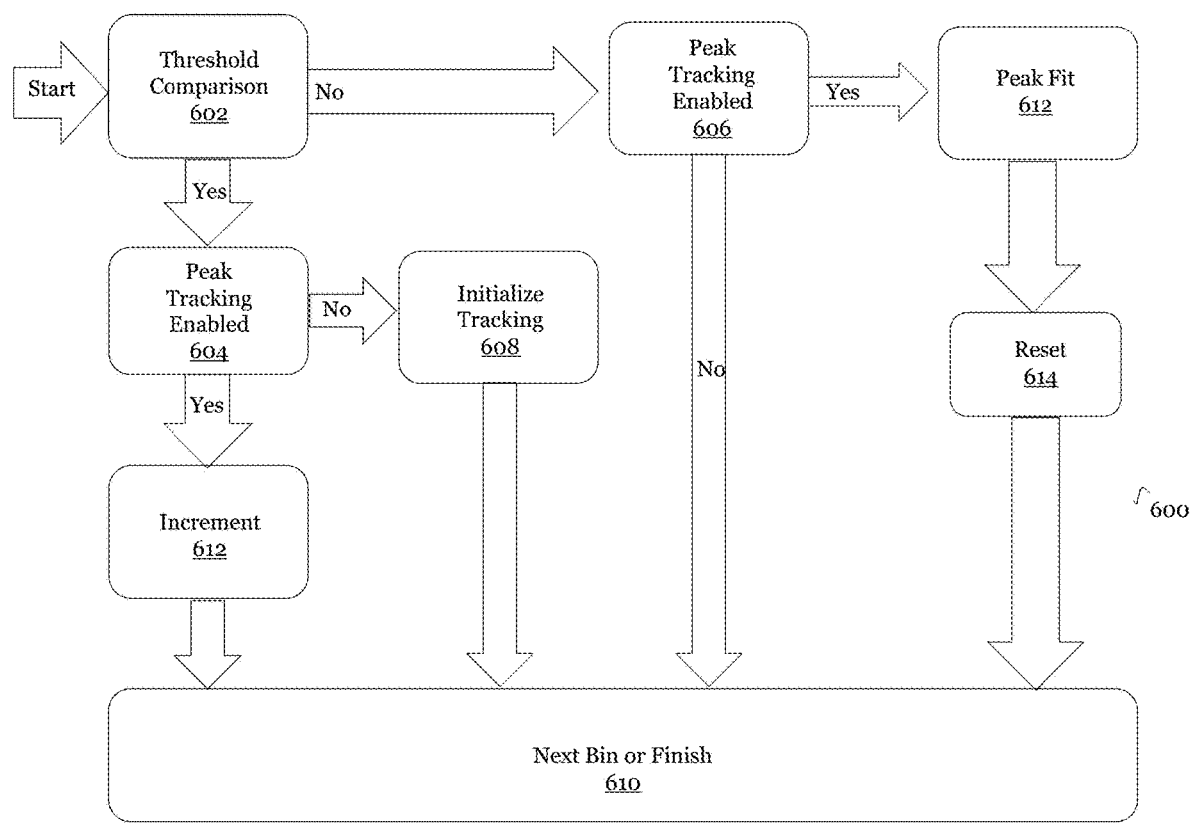
FIG. 6 depicts a single-pass method for identifying peaks in a ToF histogram in accordance with an embodiment.

FIG. 6 depicts a single-pass method for identifying peaks in a ToF histogram in accordance with embodiments.

In various embodiments, a single-pass method for identifying peaks comprises an ordered comparison of each bin in a histogram. The ordered comparison may begin at a first bin and continue to the last bin until each bin has been compared with a photon-count threshold. The order of the ordered comparison may be chronological with the first bin in the ordered comparison comprising the photon count for the photons with the shortest ToF in the histogram and the last bin in the ordered comparison comprising the photon count for the photons with the longest ToF in the histogram. In other words, the bin that stores data about the distance closest to a light ranging system (the closest bin) may be the first bin in an ordered comparison and the furthest bin may be the last bin in the ordered comparison. As will be explained more fully in the following paragraphs, results from the comparisons may trigger different operations for the future comparisons with operations being performed on a rolling basis in a single sweep through the histogram.

A step 602, for each comparison of the single pass method comprises comparing the photon count of the bin with a threshold. As will be appreciated, a threshold may be determined in different ways in different embodiments. The threshold may be calculated to distinguish signal from noise.

Depending on the outcome of the comparison, the method will proceed to a next step. If the photon count exceeds the threshold, the method 600 may progress to step 604. If the photon count is less than the threshold, the method may advance to a step 606.

At the step 604, it may be determined whether peak tracking has been enabled. If peak tracking has been not been enabled, peak tracking is enabled at step 608. This may be accomplished by setting a flag indicator to a given value. Then, at step 610, the method advances to the next bin in the ordered comparison at starts again at step 602. Or, if no more bins are left for comparison the method is finished.

If at step 604, it is determined that peak tracking has been previously enabled, a peak-tracking count may be incremented at step 612. Incrementing a count may be done to track a width of a pulse that exceeds a photon-count threshold. This width may be used for peak fitting. After incrementing, the method may advance to step 610 and advance to the next bin or finish. In various embodiments, incrementing may be not be necessary if indexing is used to identify peak width.

At step 606, it may also be determined whether peak tracking has been enabled. If not, the comparison for that bin may be finished and the method may advance to the next bin and return to step 602 (or finish depending on whether there are any bins left for comparison). If peak tracking has been enabled at step 606, this may trigger the method to advance to peak fitting at a step 612. At step 612, one or more peak locations may, or may not, be marked depending on whether preconditions for determining a peak occurred (such as a minimum peak width). After it has been determined whether or not to mark a peak (and where), peaking tracking may be reset at 614 and the method may advance to step 610 to proceed to a next bin (or finish). Resetting peak tracking may allow additional peaks to be detected within a single histogram.

By way of a example, an ordered comparison may be begin with a first bin at the threshold comparison at step 602. If the first bin is less than the threshold, the method will proceed to step 606. Because peak tracking has not been enabled, the method will proceed to step 610. The second bin will start a step 602 and the method will progress through the bins of the histogram from step 602 to step 606 and on to step 610 until a bin exceeds the threshold comparison.

At this point, the method will proceed to step 604 and then step 608 where peak tracking is enabled. The method will progress to step 610 and, then, to step 602 for the next bin (or finish). As long as subsequent bins exceed the threshold, the method will progress from step 602 to step 604 to step 612 and onto to step 610. This will continue until a bin that has a photon count less than the threshold is found at step 602. This will direct the method to step 606 and on to peak fitting at step 612 because the peak tracking was previously enabled. Peak fitting will be performed (if preconditions are met) and peak fitting reset at step 614 before proceeding to step 610.

As will be appreciated, this approach provides a nested methodology where different routines are triggered depending on results from previous comparisons. For example, these nested routines may include a base routine (the threshold comparison), a first nested routine (peak tracking) that is only reached during the base routine after a condition (or conditions) are met, and a second nested routine (peak fitting) that is only reached during the first routine when additional conditions are met. This allows a peak to be identified during a single sweep that triggers the additional routines when needed based on the histogram. As will be appreciated implementation for these steps may vary in different embodiments.

In various embodiments, the threshold for the threshold comparison may comprise an adaptive threshold. The adaptive threshold may be re-calculated for each bin as the ordered comparison progresses through the histogram.

Figure 7:
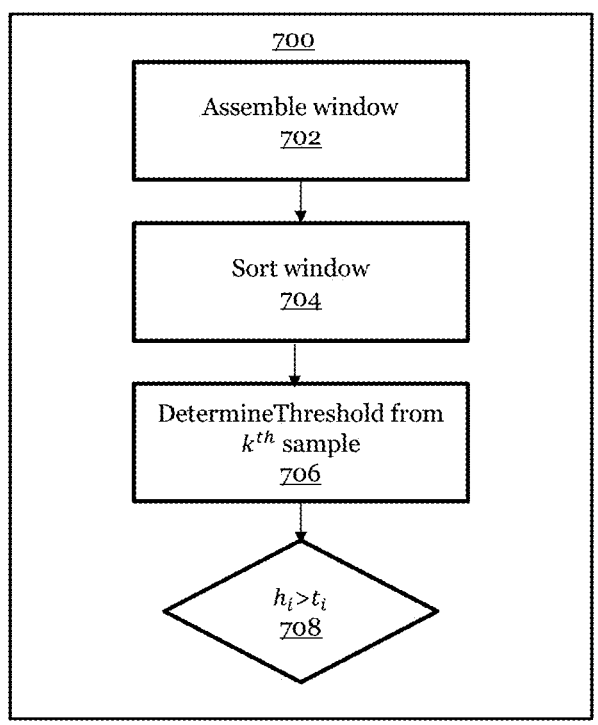
FIG. 7 depicts a method for determining an adaptive threshold in accordance with an embodiment.

FIG. 7 depicts a method for determining an adaptive threshold in accordance with an embodiment.

In various embodiments, a method 700 for determining an adaptive threshold may comprise at a step 702 assembling a window for comparison. In various embodiments, this may comprise selecting a set of bins for comparison. At a step 704, the method may comprise sorting the window. In various embodiments, this may comprise ordering the bins in terms of their magnitude (the magnitude of their photon count). And, at a step 706, the method may comprise selecting determining an adaptive threshold from the window. In various embodiments this may comprise selecting a kth sample. The kth may be multiplied by a confidence factor, which may yield the adaptive threshold, $t_i$, for an ith bin of a histogram. At a step 708, the adaptive threshold for the ith bin, $t_i$, may be compared with the photon count for the ith bin, $h_i$, for example at step 602. An adaptive threshold for each bin may be determined as the histogram sweep occurs.

In various embodiments, bins for a window (comparison bins) for an ith bin may be selected for calculating an adaptive threshold based on their proximity to the ith bin. For the purposes of reference, when bins are indexed chronologically depending on the ToF of the photons grouped in the bins, the two closest bins to an ith bin will comprise the two bins adjacent to the ith. By way of further example, for a histogram comprising 144 bins indexed chronologically from 1 to 144 based on their ToF, the bins closest in proximity to the second bin are the first bin and the third bin.

For assembling a window, a guard range may be established surrounding a bin under scrutiny. Bins within the guard range may be excluded from the set of comparison bins. This may be beneficial to prevent bins in the immediate vicinity of a bin under scrutiny from interfering with the adaptive threshold calculation. Guard bins may also be included in a window, as well as the ith bin, even if they are not used for determining an adaptive threshold.

Figure 8:
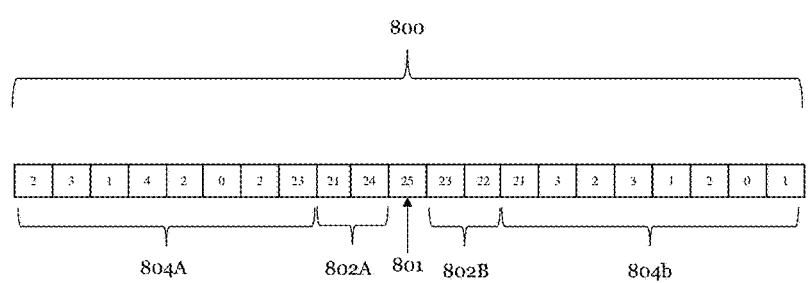
FIG. 8 depicts a window of bins of a histogram for calculating an adaptive threshold in accordance with an embodiment.

FIG. 8 depicts a window of bins of a histogram for calculating an adaptive threshold in accordance with an embodiment.

The set of bins for calculating an adaptive threshold may be taken from a histogram. The window 800 may comprise guard bins flanking an ith bin 801. The ith bin 801 may be at the center of the window. The ith bin may store the photon count that may be compared with an adaptive threshold calculated from the window 800. A first set of guard bins 802A may comprise bins counting photons having ToF less than the bin under scrutiny.

A second set of guard bins 802B may comprise bins counting photons having ToF greater than the bin under scrutiny. As will be appreciated, increasing the number of guard bins decreases the likelihood that part of a peak will be grouped into the comparison set used for calculating the adaptive threshold. However, increasing the guard bins can make the comparison more remote from the bin under scrutiny, which may impact the accuracy of the adaptive threshold. The number of guard bins may vary depending on a system and balance these considerations.

The set of comparison bins used for calculating the adaptive threshold may be formed of two sets of comparison bins comprising N bins each. The number N may be different in various embodiments. A first set of comparison bins 804A may comprise bins counting photons having ToF less than the bin under scrutiny. A second set of comparison bins 804B may comprise bins counting photons having ToF greater than the bin under scrutiny. The set of bins used for calculating the adaptive threshold may thus comprise the 2N closest bins to ith bin 802 excluding the guard bins. The window 801 may comprise the first set of comparison bins 804A, the second set of comparison bins 804B, the first set of guard bins 802A, the second set of guard bins 802B, and the ith bin 801.

Once the window is determined, the window may be sorted. In various embodiments, this may occur at step 704. In various embodiments, this may comprise sorting comparison bins depending on their magnitude (the size of their respective photon counts). For example, set of bins with photon counts [2, 3, 1, 4, 2, 0, 2, 23, 21, 3, 2, 3, 1, 2, 0, 1] may be sorted according to magnitude by magnitude into a set of bins with photon counts [0, 0, 1, 1, 1, 2, 2, 2, 2, 2, 3, 3, 3, 4, 21, 23]. Note that FIG. 8 identifies the magnitude of a bins photon count with a number inside the bin.

To determine an adaptive threshold value from the sorted set, which may occur at step 706, a "kth" bin may be selected from the sorted set of comparison bins as a comparison basis for the adaptive threshold. For example, if "k" is set to 12, the 12th largest member of the sorted set may be selected as the comparison basis. Carrying on with this example, the 12th member of the sorted set is 3. The value of "k" may vary in different embodiments. The comparative basis may be multiplied by a confidence factor, which may yield the adaptive threshold. For example, if the comparative basis is 3, and a confidence factor is 2, the adaptive threshold may be 6. Equation 1, below, represents this relationship for calculating an adaptive threshold, $t_i$, for an ith bin.

$$t_i = \alpha w_i(k) \qquad \text{Equation 1}$$

In Equation 1, $w_i$ may be the set of comparison bins for the window, and $\alpha$ is the confidence factor.

The confidence factor may be a measure of the variance of the histogram and may be selected to reduce the likelihood of false peak detection. With more variance in histogram, it may be more advantageous to increase the confidence factor. The confidence factor may, itself, be the product of a confidence value and a measure of histogram differential as described by Equation 2.

$$\alpha = s*c \qquad \text{Equation 2}$$

In Equation 2, c is a confidence value, and the s is histogram-differential measure. The confidence value c comprises a tuning parameter. The confidence value may comprise a system specific parameter, which may be set at calibration for unique system configuration. In various embodiments re-calibration may be performed during the lifetime of a device and the confidence may be updated. The histogram differential may be retrieved from a lookup table depending on the difference between the maximum and minimum values of the histogram. Max and min values may be monitored during histogram accumulation using hardware. For example, when the difference between the maximum and minimum values is greater than 5000 photons, the histogram-differential measure s may be set to 2.0. When the difference between the maximum and minimum values is less than 5000 photons but greater than 1000, the histogram-differential measure s may be set to 1.5. When the difference between the maximum and minimum values is less than 1000 photons, the histogram-differential measure s may be set to 1.0. As will be appreciated, the foregoing example is to provide for illustration different values and different rules or ranges for a lookup table may be used in various embodiments. Predefined values and decision-making rules may be system specific. They may relate to laser power and integration time, photon detection efficiency, and alignment with expected signal-to-noise ratio of the system In various embodiments the histogram-differential measure s may be calculated. Equation 3 provides a formula for calculating the histogram-differential measure s.

$$s = 1 + \frac{\max(h) - \min(h)}{\max(h)} \qquad \text{Equation 3}$$

In Equation 2, max(h) may refer the maximum photon count in the histogram and min(h) may refer to the minimum photon count in the histogram.

After a comparison basis has been determined, an adaptive threshold may be determined using the comparison basis and the kth value. This may be used to compare with the photon count at the ith bin, for example, at step 602. And, a new adaptive threshold may be determined for use with the next bin.

In various embodiments, the progression through a histogram may be referred to as a moving window. As the adaptive threshold for each bin is calculated, the new comparison bins may be used so the window may progress through the histogram. The window for an adaptive threshold may move through the histogram as the ordered comparison advances through the histogram.

Figure 9:
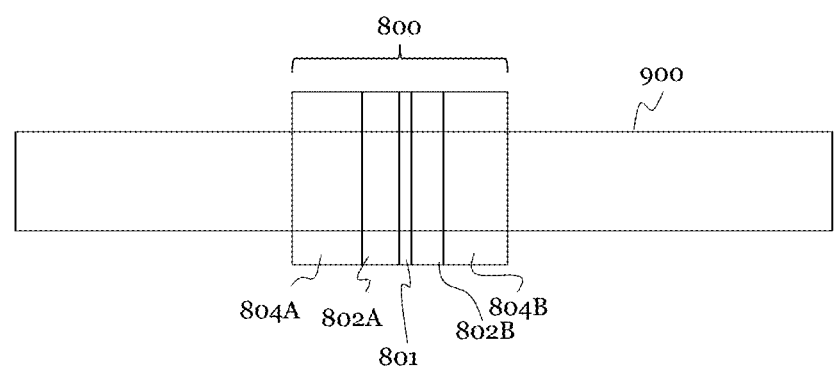
FIG. 9 depicts a window of a histogram in accordance with an embodiment.

FIG. 9 depicts a window of a histogram in accordance with an embodiment.

FIG. 9 depicts a histogram 900 of full length. As apparent from FIG. 9, a window 800 centered at an ith bin 801 only spans a portion of the histogram. For example, where a width of the window may be referred to as the number bins included in the respective window, a moving window may comprise a width equal to the sum of the widths of the first set of guard bins 802A, the second set of guard bins 802B, first set of comparison bins 804A, the second set of comparison bins 804B, and ith bin 801. This is described by Equation 4 where G is the number of guard bins.

$$\text{window width} = 2N + 2G + 1 \qquad \text{Equation 4}$$

The window 800 may thus be smaller than overall size of the histogram 900. As will be appreciated, bin selection for a window may need to be adjusted when near the beginning or end of the histogram. For example, when bin under scrutiny is less than G+N bins from the last bin in the ordered comparison the end bins for the window by be selected from the beginning of the histogram. Similarly, when less than G+N bins from the first bin, the bins for the beginning of the window may be selected from the end of the histogram.

In various embodiments, the adaptive threshold may be calculated according to an Ordered-Statistic-Constant False Alarm Rate algorithm (OS-CFAR). In various embodiments, Cell Averaging CFAR may be utilized, or other approaches. In various embodiments, CFAR may be adapted for ToF applications using differential histogram measures for self-contained per-pixel weighting.

Figure 10:
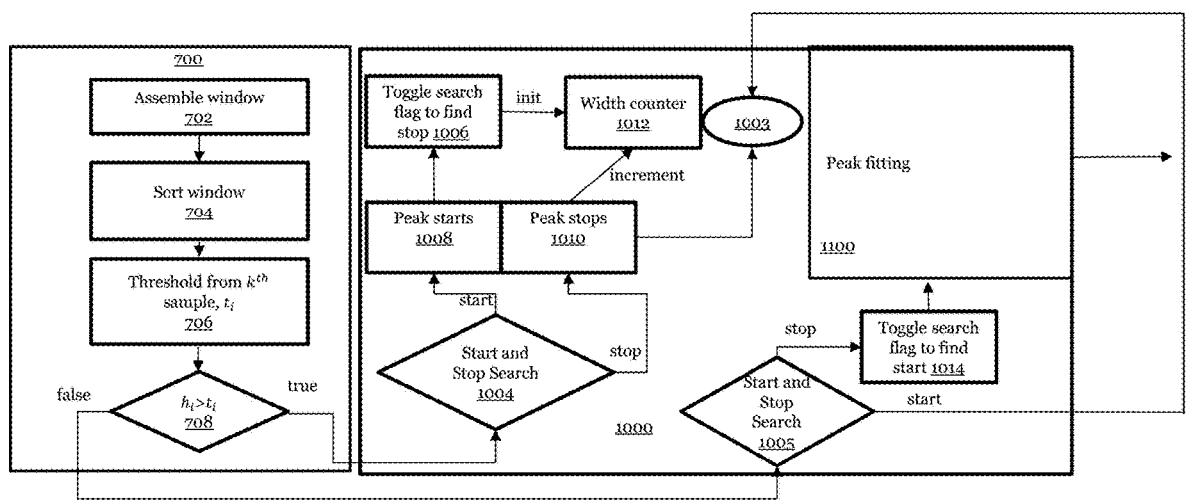
FIG. 10 depicts routines for finding peaks in a histogram in accordance with an embodiment.

FIG. 10 depicts routines for finding peaks in a histogram in accordance with an embodiment.

After a threshold comparison has been made for a bin (for example at step 708), the results of the threshold comparison may determine what follows. This may entail triggering peak tracking, moving to a next bin, or finishing the method. Peak tracking may be performed to identify the beginning and end of a peak that corresponds to an optical pulse. An optical pulse emitted by a light ranging system may have a known duration (width). It may be expected that a histogram pulse has a peak width that corresponds to a width of an optical pulse. Peak tracking may identify the rising edge and falling edge pair of a peak. The rising edge may be a first bin exceeding a threshold, and a falling edge may be a last bin exceeding a threshold.

For an ordered comparison, a method for peak fitting may entail searching for a first bin exceeding a threshold (a rising edge). Before a rising edge is found (before peak tracking has been enabled), the method may progress to a next bin in response to determining a current bin falls below a threshold. For example, if the comparison at step 708 is false (the photo count for an ith bin, $h_i$, is less than adaptive threshold $t_i$), the method may advance to step 1002 where it is determined whether a rising edge has been found. This may correspond to step 606, where it is determined whether peak tracking has been enabled and a search for a falling edge is ongoing. If it peak tracking has not been enabled, then the method progresses to step 1003 and advances to the next bin or finishes.

If the comparison at step 708 is true, the method may advance to step 1004 of a peak tracking method 1000. Here it may be checked whether peak search is looking for a rising edge (start) or a falling edge (stop). If the search state is looking for a start, a peak start may be stored in 1008. In various embodiments a flag or other indicator may be toggled to indicate the current peak search state to search to find a rising or falling edge. For example, a flag may toggled at step 1006 to indicate search for a stop, which may be described as putting the system in a stop-search state. And, the flag may be toggled back to an original state at step 1014 to begin another start search, which may be reached after a stop has been found. This may be referred to as a start-search state. Also, at 1006, a width count may be initialized for the histogram pulse. The method moo may advance to 1003 to advance to the next bin (at step 702) or finish (if all bins have been searched). The location of a falling edge (stop position) may be initialized at the position of the current bin. This location may be updated if more bins exceeding the threshold are found before the peak search has been completed (before a falling edge has been found).

Subsequent bins exceeding the threshold while peak searching is enabled may advance to step 1004. Having already toggled to a stop-search state, the method may advance to step low where the current bin position may be stored as the stop position. The width count may be incremented at 1012. As long as subsequent bins exceed the threshold while searching for a stop, the width count may be incremented and the stop position updated so the new current replaces the previous bin marked during the last cycle. This will continue until a bin falls below the threshold, which may bypass step 1004 (because the comparison at step 708 is false) and direct the method to step 1005. If performing a start-start search (as indicated by a flag or other indicator) the method will advance to step 1004 and advance to the next bin or finish. If performing a stop search the method may advance to step 1014 where the flag or other indicator may be toggled and to the peak fitting routine because the peak search indication is enabled. The location of the last bin exceeding the threshold may have been marked as the position of falling edge (stop position) immediately before the falling edge (stop position) was found and a count for each consecutive bin exceeding the threshold may have been collected while consecutive bins exceeding the threshold were compared with the threshold. It should be appreciated, the state may switched from start-search to stop search (or vice versa) in a different sequence in different embodiments. For example, step 1014 may be performed after peak fitting or step 1006 may be performed after incrementing a width counter.

As will be appreciated, a single-pass method to identify peaks consistent with embodiments allows identification of multiple targets in a field of view. Cross-talk and other parasitic reflections may be detected as a target output. Differentiation in post-processing using the peaks identified by a single-pass method may be utilized to filter parasitic reflections.

A single-pass method for identifying peaks in a ToF histogram may comprise a combination of methods such a method 700 for determining an adaptive threshold, a peak tracking method 1000, and a peak fitting method 1100.

Figure 11:
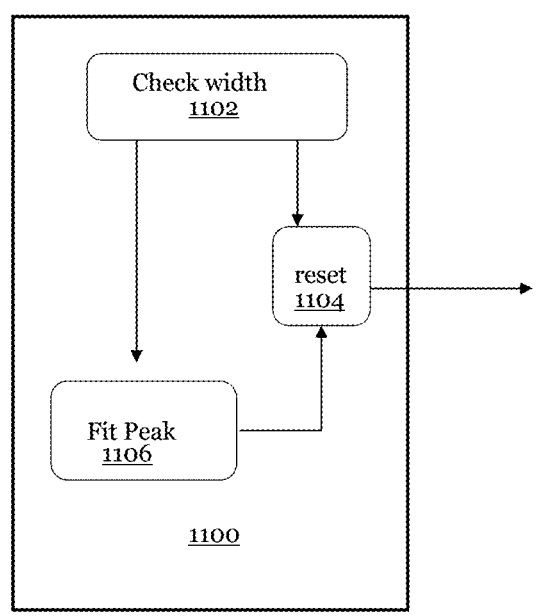
FIG. 11 depicts a peak fitting method in accordance with an embodiment.

FIG. 11 depicts a peak fitting method in accordance with an embodiment.

In various embodiments a peak fitting method 1100 may determine if a histogram pulse detected during peak tracking exceeds a minimum width threshold at a step 1102. This may be advantageous to filter out small transient artifacts in the histogram data, which may falsely trigger peak identification. The minimum width threshold may comprise a number of bins. Determining a width of a histogram pulse may comprise identifying a number of bins between the bin exceeding the adaptive threshold (rising edge) and the bin falling below the adaptive threshold (falling edge). This may be accomplished using a width count accumulated during peak tracking. The width of a histogram pulse may also be determined from the difference between the index of a rising edge and the index of a falling edge of the pulse, both of which may have been marked during peak tracking. The minimum width threshold, which may be referred to as a minimum peak width, can be determined from the width of an optical pulse emitted into a system. For example, the it may be a full-width half-maximum width (FWHM) of an optical pulse emitted for light ranging. It should be appreciated that the minimum peak width may vary from embodiment to embodiment. It may be wider or narrower than the FWHM. A narrower minimum peak width may be advantageous in some embodiments to detect more close targets and merged targets, while a wider width may be desirable to allow detection of weaker targets.

At step 1102, the width of the pulse in the histogram may be compared with the minimum width threshold. If the pulse width from the histogram data is less than the minimum width threshold, the histogram pulse may be discarded and the method may progress to step 1104. At step 1104, peak tracking may be reset. This may allow the single-pass method for identifying peaks in a ToF histogram to begin looking for rising edges again (instead of looking for falling edges). In various embodiments, the step 1104 may comprise resetting the status of a flag or other indicator to a value that disables peak tracking. Various data may also be output also at step 1104. These may include various confidence metrics such as confidence ratio or signal-to-noise ratio. From step 1104, the method may progress to step 1003 and advances to the next bin of the ordered comparison or finish.

If the pulse width from the histogram is greater than the width threshold at step 1102, the method may advance to step 1106 which comprises marking a peak location (or peak locations) between the bin exceeding the adaptive threshold and the bin falling below the adaptive threshold. This may comprise marking the peak location at a median location between the bin exceeding the adaptive threshold and the bin falling below the adaptive threshold. In various embodiments, the single-pass method for identifying peaks in a ToF histogram may further comprise tracking the number of peaks marked during the single pass. This may comprise incrementing a tracker each time peak is marked.

In various embodiments, the peak fitting method may also determine whether a single pulse segment spans multiple objects in the field of view. If more than one object in a field of view are close together or at similar distances from a light-ranging system, photons reflected from them and detected by an optical receiver may produce a single large pulse in a histogram rather than multiple individual pulses. To account for this, the width of a histogram pulse, at step 1106, may also be compared with a maximum width threshold. Again, the width of a histogram pulse may be determined from a count during peak tracking and from indexes of the rising edge and falling edge. If the histogram pulse exceeds the maximum-width threshold multiple pulses may be fit between the rising edge and falling edge.

In various embodiments, the maximum pulse width may be set to be one bin greater than the full-width half-maximum width of the optical pulse emitted by a light ranging system. After determining that a width of a histogram pulse exceeds the minimum width at step 1102, it may then be determined the histogram pulse is less than the maximum width. If the histogram pulse width is less than the maximum width, a single pulse may be fit between the rising and falling edges of the histogram pulse.

If the histogram pulse width is greater than the maximum width threshold, a first peak may be marked, and it may be determined whether to mark additional peaks. In various embodiments a first start position bin may be set to the rising edge (start position) determined by the peak tracking method while a first stop position bin may be set so the width of a first histogram pulse is equal to the full-width half-maximum width of the optical pulse emitted by the light-ranging system. In other words, the distance between the first start position bin and first stop position bin may be set to be equal to the full-width half-maximum width of the optical pulse emitted by the light-ranging system equation. And, a first peak may be marked between the first start position bin and the stop position bin (for example at a median position). A second start position may also be declared at this first stop position.

Any second width (width beyond the first stop position and second start position) may be compared with a minimum width threshold for subsequent peaks to determine whether to set a second peak. In various embodiments, the minimum width threshold for subsequent peaks may be equal to the minimum width threshold. For example, the remaining width (width between the second start position and the falling edge identified by the peak tracking method) may be compared to minimum width threshold to determine if a second peak should be marked. In various embodiments, the minimum width threshold for subsequent peaks may be different than the minimum width threshold for the first peak. For example, the minimum width threshold for subsequent peaks may be set equal to 2G, where G is the number of guard bins.

If the minimum width threshold for subsequent peaks is exceeded by the remaining width, a second peak may be set between the stop position and associated second start position and the falling edge determined by the peak tracking method. In various embodiments, the second start position bin may be set at a bin that is located at the falling edge determined by the peak tracking algorithm minus the full-width half-maximum width of the optical pulse, or at the first stop position bin (whichever is wider). A second peak can then be fit between the second start position and the falling edge using the same approach used for the first peak. As will be appreciated, additional peaks (beyond the second peak) may also be added until the remaining width is less than the minimum width threshold for subsequent peaks.

In various embodiments, subsequent peaks may be discarded if a photon detector afterpulsing confidence score for the second peak is less than an afterpulsing confidence score threshold. Afterpulsing is due to "trapped photons" in deeper silicon layers, which cause delayed responses due to charge carrier diffusion. In other words, charge is trapped, which is slowly released after bulk photon absorption. This may cause an apparent elevated signal level at the end of a response pulse. In various embodiments, after a second peak is fit, an afterpulsing confidence score may be calculated to determine whether the shape of the tail of the histogram pulse comprises afterpulsing caused by trailing effects of the optical receiver hardware (such as a SPAD). If the afterpulsing confidence score for the second peak is too low, the second peak may be discarded.

An example confidence metric is provided as the sum of the photon count from the histogram, h, and the adaptive threshold, t, for a nth identified target as described in Equation 5.

$$\text{Confidence}_n = \sum_{i=start_n}^{stop_n} \frac{h(i)}{t(i)} \qquad \text{Equation 5}$$

In various embodiments, the second peak, n, in a merged peaked cluster may be rejected if the first peak, n-1, is dramatically larger to reject elevated signal levels due to afterpulsing. A positive factor, p<1, may be set to determine whether to reject such target, e.g. p=0.4:

Reject target$_n$ if Confidence$_n$<p×Confidence$_{n-1}$

As will be appreciated, in various embodiments, other peak fitting approaches may be utilized to mark the location of the peak or peaks.

Figure 12:
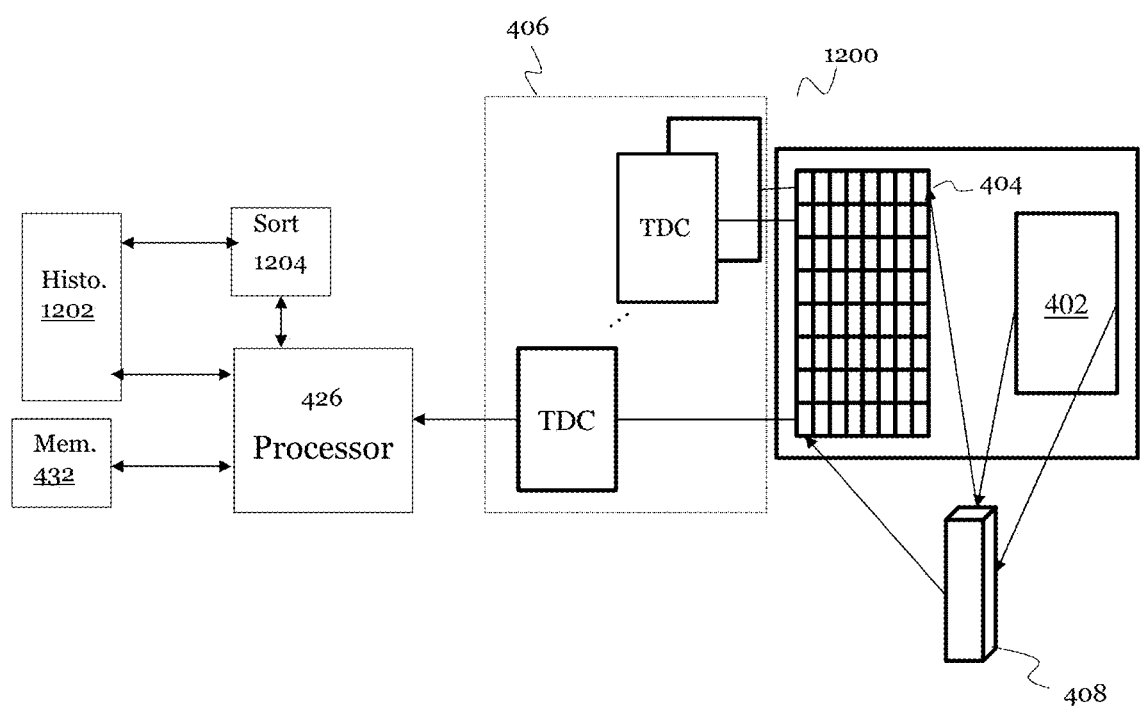
FIG. 12 depicts a light-ranging system in accordance with an embodiment.

FIG. 12 depicts a light-ranging system in accordance with an embodiment.

In various embodiments, a light-ranging system 1200 may comprise an optical source 402 configured to emit optical pulses for light-ranging. The light-ranging system 1200 may further comprise an optical receiver 404 configured to detect photons; and one or more time to digital converters 406 in communication with the optical receiver and configured to output times of flight of photons detected by the optical receiver 404. The light-ranging system 1200 may further comprise a processor 426 in communication with the one or more time to digital converters 406 to receive the times of flight of photons detected by the optical receiver 404 and store them in a time of flight histogram. The time of flight histogram may be stored in a register 1202 or other appropriate memory The light-ranging system may further comprise a memory 432 storing an instruction set that, when executed, causes the processor 426 to begin an ordered comparison of each bin in the time of flight histogram with an adaptive threshold until a bin exceeding the adaptive threshold is found, each bin of the histogram representing a photon count corresponding to a distance from the light-ranging system; continue the ordered comparison after finding the bin exceeding the adaptive threshold until a bin falling below the adaptive threshold is found; determine a width by identifying a number of bins between the bin exceeding the adaptive threshold and the bin falling below the adaptive threshold; find the width exceeds a width threshold; mark a peak location between the bin exceeding the adaptive threshold and the bin falling below the adaptive threshold; and continue the ordered comparison until each bin has been compared with the adaptive threshold one time.

The memory may comprise a non-transient computer readable memory. In various embodiments, the light-ranging system may comprise a system on a chip, or application specific integrated circuit.

In various embodiments, sorting for a window may be performed using sorting circuitry 1204. As will be appreciated, sorting the bins of a window based on the magnitude of their photon counts may be accomplished with a fixed number of operations. In various embodiments, a simple sorting network may be utilized. An adaptive threshold may be advantageous because it allows smaller sets of bins for comparisons, which in turn may allow hardware implementation for sorting. Hardware may implement a Bose-Nelson sorting algorithm or other sorting methods.

Figure 13:
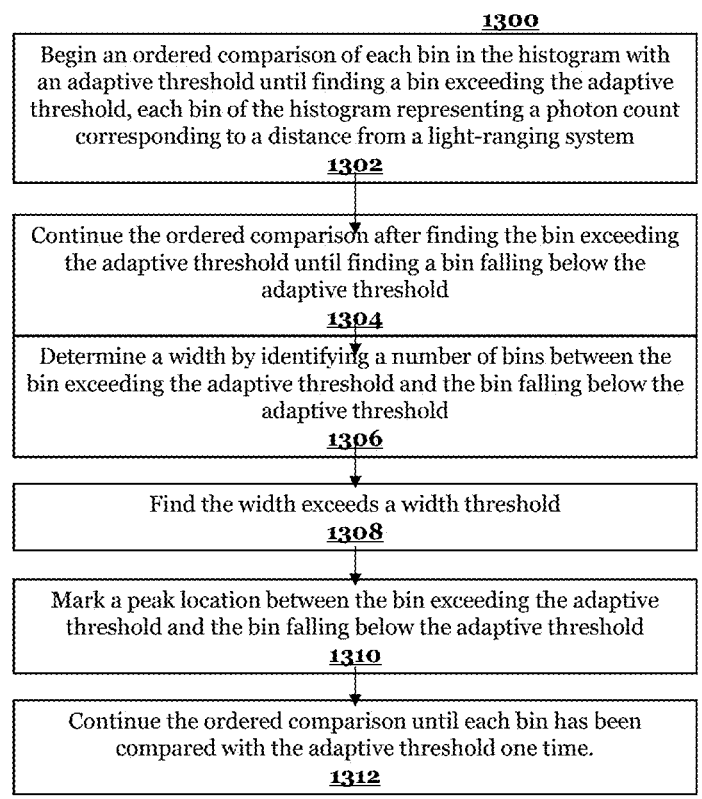
FIG. 13 depicts a method to identify peaks in a histogram in accordance with an embodiment.

FIG. 13 depicts a method to identify peaks in a histogram in accordance with an embodiment.

In various embodiments, the method 1300 may comprise at a step 1302, beginning an ordered comparison of each bin in the histogram with an adaptive threshold until finding a bin exceeding the adaptive threshold, each bin of the histogram representing a photon count corresponding to a distance from a light-ranging system; at a step 1304, continuing the ordered comparison after finding the bin exceeding the adaptive threshold until finding a bin falling below the adaptive threshold; at a step 1306, determining a width by identifying a number of bins between the bin exceeding the adaptive threshold and the bin falling below the adaptive threshold; at a step 1308, finding the width exceeds a width threshold; at a step 1310, marking a peak location between the bin exceeding the adaptive threshold and the bin falling below the adaptive threshold; and at a step 1312, continuing the ordered comparison until each bin has been compared with the adaptive threshold one time.

In various embodiments, the method 1300 may further comprise, finding an other bin exceeding the adaptive threshold after marking the peak location, finding an other bin falling below the adaptive threshold, determining an other an other width by identifying an other number of bins between the other bin exceeding the adaptive threshold and the other bin falling below the adaptive threshold, and marking an other peak location between the other bin exceeding the adaptive threshold and the other bin falling below the adaptive threshold.

In various embodiments, the method 1300 may further comprise, calculating the adaptive threshold using Ordered Statistics-Constant False Alarm Rate.

In various embodiments, the method 1300 may further comprise, calculating the adaptive threshold for each bin.

In various embodiments, the method 1300 may further comprise, wherein calculating the adaptive threshold for each bin comprises selecting a set of bins for comparison, ordering the bins based on magnitude, and selecting a kth bin as a comparison basis.

In various embodiments, the method 1300 may further comprise, wherein the adaptive threshold is calculated for each bin by multiplying the comparison basis by a confidence factor.

In various embodiments, the method 1300 may further comprise, wherein determining the width comprises incrementing a count initialized when finding the bin exceeding the adaptive threshold and continued until finding the bin falling below the adaptive threshold.

In various embodiments, the method 1300 may further comprise, determining the width is less than a full width half maximum of a pulse width used by the light-ranging system to collect the photon count of each bin, and wherein marking the peak location comprises marking the peak location at a median location between the bin exceeding the adaptive threshold and the bin falling below the adaptive threshold.

In various embodiments, the method 1300 may further comprise, determining the width is greater than a full width half maximum of a pulse width used by the light-ranging system to collect the photon count of each bin, assigning a stop position bin, a width between the stop position bin and the bin exceeding the adaptive threshold being approximately equal to the full width half maximum of the pulse width, and wherein marking the peak location comprises marking the peak location a median position between the bin exceeding the adaptive threshold and the stop position bin.

In various embodiments, the method 1300 may further comprise, determining a width between the stop-position bin and the bin falling below the adaptive threshold is greater than a minimum width threshold for subsequent peaks, marking a second peak location between the peak location and the bin falling below the adaptive threshold.

Figure 14:
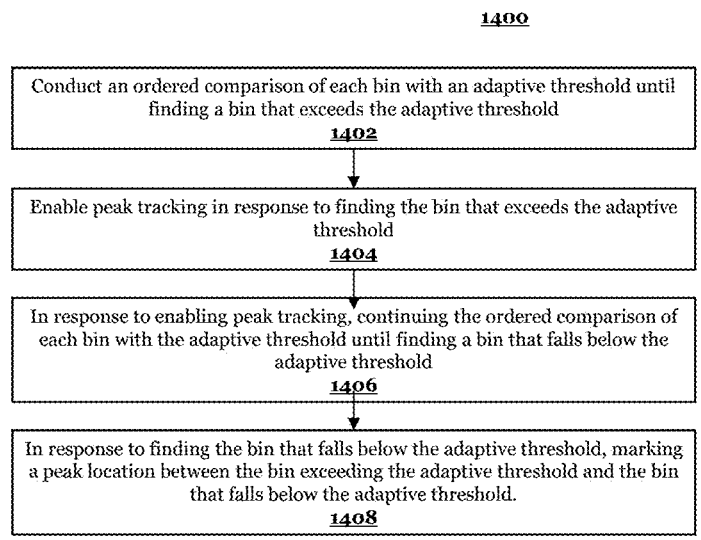
FIG. 14 depicts a single-pass method for identifying peaks in a time of fight histogram in accordance with an embodiment.

FIG. 14 depicts a single-pass method for identifying peaks in a time of fight histogram in accordance with an embodiment.

In various embodiments, the method 1400 may comprise, at a step 1402, conducting an ordered comparison of each bin with an adaptive threshold until finding a bin that exceeds the adaptive threshold; at a step 1404, enabling peak tracking in response to finding the bin that exceeds the adaptive threshold; at a step 1406, in response to enabling peak tracking, continuing the ordered comparison of each bin with the adaptive threshold until finding a bin that falls below the adaptive threshold; and at a step 1408, in response to finding the bin that falls below the adaptive threshold, marking a peak location between the bin exceeding the adaptive threshold and the bin that falls below the adaptive threshold.

In various embodiments, the method 1400 may further comprise, in response to finding the bin that falls below the adaptive threshold, disabling peak tracking.

In various embodiments, the method 1400 may further comprise, in response to disabling peak tracking, continuing the ordered comparison of each bin with the adaptive threshold until finding another bin exceeding the adaptive threshold.

In various embodiments, the method 1400 may further comprise, wherein enabling peak tracking comprises setting a flag to a peak-tracking value.

In various embodiments, the method 1400 may further comprise, wherein disabling peak tracking comprises restoring the flag to an original value.

Example 1. A method to identify peaks in a histogram: the method including beginning an ordered comparison of each bin in the histogram with an adaptive threshold until finding a bin exceeding the adaptive threshold, each bin of the histogram representing a photon count corresponding to a distance from a light-ranging system; continuing the ordered comparison after finding the bin exceeding the adaptive threshold until finding a bin falling below the adaptive threshold; determining a width by identifying a number of bins between the bin exceeding the adaptive threshold and the bin falling below the adaptive threshold; finding the width exceeds a width threshold; marking a peak location between the bin exceeding the adaptive threshold and the bin falling below the adaptive threshold; and continuing the ordered comparison until each bin has been compared with the adaptive threshold one time.

Example 2. The method of Example 1, further including finding an other bin exceeding the adaptive threshold after marking the peak location, finding an other bin falling below the adaptive threshold, determining an other width by identifying an other number of bins between the other bin exceeding the adaptive threshold and the other bin falling below the adaptive threshold, and marking an other peak location between the other bin exceeding the adaptive threshold and the other bin falling below the adaptive threshold.

Example 3. The method of Example 1 or Example 2, further including calculating the adaptive threshold using Ordered Statistics-Constant False Alarm Rate.

Example 4. The method of Example 1 through Example 3, further including calculating the adaptive threshold for each bin.

Example 5. The method of Example 1 through Example 4, wherein calculating the adaptive threshold for each bin includes selecting a set of bins for comparison, ordering the bins based on magnitude, and selecting a kth bin as a comparison basis.

Example 6. The method of Example 1 through Example 5, wherein the adaptive threshold is calculated for each bin by multiplying the comparison basis by a confidence factor.

Example 7. The method of Example 1 through Example 6, wherein determining the width includes incrementing a count initialized when finding the bin exceeding the adaptive threshold and continued until finding the bin falling below the adaptive threshold.

Example 8. The method of Example 1 through Example 7, further including determining the width is less than a full width half maximum of a pulse width used by the light-ranging system to collect the photon count of each bin, and wherein marking the peak location includes marking the peak location at a median location between the bin exceeding the adaptive threshold and the bin falling below the adaptive threshold.

Example 9. The method of Example 1 through Example 8, further including determining the width is greater than a full width half maximum of a pulse width used by the light-ranging system to collect the photon count of each bin, assigning a stop position bin, a width between the stop position bin and the bin exceeding the adaptive threshold being approximately equal to the full width half maximum of the pulse width, and wherein marking the peak location includes marking the peak location a median position between the bin exceeding the adaptive threshold and the stop position bin.

Example 10. The method of Example 1 through Example 9, further including determining a width between the stop-position bin and the bin falling below the adaptive threshold is greater than a minimum width threshold for subsequent peaks, marking a second peak location between the peak location and the bin falling below the adaptive threshold.

Example 11. A single-pass method for identifying peaks in a time of flight histogram, the single-pass method including: conducting an ordered comparison of each bin with an adaptive threshold until finding a bin that exceeds the adaptive threshold; enabling peak tracking in response to finding the bin that exceeds the adaptive threshold; in response to enabling peak tracking, continuing the ordered comparison of each bin with the adaptive threshold until finding a bin that falls below the adaptive threshold; and in response to finding the bin that falls below the adaptive threshold, marking a peak location between the bin exceeding the adaptive threshold and the bin that falls below the adaptive threshold.

Example 12. The single-pass method of Example 11, further including, in response to finding the bin that falls below the adaptive threshold, disabling peak tracking.

Example 13. The single-pass method of Example 11 or Example 12, further including, in response to disabling peak tracking, continuing the ordered comparison of each bin with the adaptive threshold until finding another bin exceeding the adaptive threshold.

Example 14. The single-pass method of Example 11 through Example 13, wherein enabling peak tracking includes setting a flag to a peak-tracking value.

Example 15. The single-pass method of Example 11 through Example 14, wherein disabling peak tracking includes restoring the flag to an original value.

Example 16. A light-ranging system including: an optical source configured to emit optical pulses for light-ranging; an optical receiver configured to detect photons; a time to digital converter in communication with the optical receiver and configured to output times of flight of photons detected by the optical receiver; and a processor in communication with the time to digital converter to receive times of flight of photons detected by the optical receiver and store them in a time of flight histogram; a memory storing an instruction set that, when executed, causes the processor to begin an ordered comparison of each bin in the time of flight histogram with an adaptive threshold until a bin exceeding the adaptive threshold is found, each bin of the times of flight histogram representing a photon count corresponding to a distance from the light-ranging system; continue the ordered comparison after finding the bin exceeding the adaptive threshold until a bin falling below the adaptive threshold is found; determine a width by identifying a number of bins between the bin exceeding the adaptive threshold and the bin falling below the adaptive threshold; find the width exceeds a width threshold; mark a peak location between the bin exceeding the adaptive threshold and the bin falling below the adaptive threshold; and continue the ordered comparison until each bin has been compared with the adaptive threshold one time.

Example 17. The light-ranging system of Example 16, the width is determined by incrementing a count initialized when finding the bin exceeding the adaptive threshold and continued until finding the bin falling below the adaptive threshold.

Example 18. The light-ranging system of Example 16 or Example 17, wherein the peak location is marked at a median location between the bin exceeding the adaptive threshold and the bin falling below the adaptive threshold.

Example 19. The light-ranging system of Example 16 through Example 18, wherein the adaptive threshold is calculated using Ordered Statistics-Constant False Alarm Rate.

Example 20. The light-ranging system of Example 16 through Example 17, wherein the adaptive threshold is calculated for each bin.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method to identify peaks in a histogram:
beginning an ordered comparison of each bin in the histogram with an adaptive threshold until finding a bin exceeding the adaptive threshold, each bin of the histogram representing a photon count corresponding to a distance from a light-ranging system to an object in its field of view;

continuing the ordered comparison after finding the bin exceeding the adaptive threshold until finding a bin falling below the adaptive threshold;

determining a width by identifying a number of bins between the bin exceeding the adaptive threshold and the bin falling below the adaptive threshold;

finding the width exceeds a width threshold;

marking a peak location between the bin exceeding the adaptive threshold and the bin falling below the adaptive threshold;

continuing the ordered comparison until each bin has been compared with the adaptive threshold one time; and determining the distance to the object based on the marked peak location.

2. The method of claim 1, further comprising finding an other bin exceeding the adaptive threshold after marking the peak location, finding an other bin falling below the adaptive threshold, determining an other width by identifying an other number of bins between the other bin exceeding the adaptive threshold and the other bin falling below the adaptive threshold, and marking an other peak location between the other bin exceeding the adaptive threshold and the other bin falling below the adaptive threshold.

3. The method of claim 1, further comprising calculating the adaptive threshold using Ordered Statistics-Constant False Alarm Rate.

4. The method of claim 1, further comprising calculating the adaptive threshold for each bin.

5. The method of claim 4, wherein calculating the adaptive threshold for each bin comprises selecting a set of bins for comparison, ordering the bins based on magnitude, and selecting a kth bin as a comparison basis.

6. The method of claim 5, wherein the adaptive threshold is calculated for each bin by multiplying the comparison basis by a confidence factor.

7. The method of claim 1, wherein determining the width comprises incrementing a count initialized when finding the bin exceeding the adaptive threshold and continued until finding the bin falling below the adaptive threshold.

8. The method of claim 1, further comprising determining the width is less than a full width half maximum of a pulse width used by the light-ranging system to collect the photon count of each bin, and wherein marking the peak location comprises marking the peak location at a median location between the bin exceeding the adaptive threshold and the bin falling below the adaptive threshold.

9. The method of claim 1, further comprising determining the width is greater than a full width half maximum of a pulse width used by the light-ranging system to collect the photon count of each bin, assigning a stop position bin, a width between the stop position bin and the bin exceeding the adaptive threshold being approximately equal to the full width half maximum of the pulse width, and wherein marking the peak location comprises marking the peak location a median position between the bin exceeding the adaptive threshold and the stop position bin.

10. The method of claim 9, further comprising determining a width between the stop position bin and the bin falling below the adaptive threshold is greater than a minimum width threshold for subsequent peaks, marking a second peak location between the peak location and the bin falling below the adaptive threshold.

11. A single-pass method for identifying peaks in a time of flight histogram, the single-pass method comprising:

conducting an ordered comparison of each bin with an adaptive threshold until finding a bin that exceeds the adaptive threshold;

enabling peak tracking in response to finding the bin that exceeds the adaptive threshold;

in response to enabling peak tracking, continuing the ordered comparison of each bin with the adaptive threshold until finding a bin that falls below the adaptive threshold;

in response to finding the bin that falls below the adaptive threshold, marking a peak location between the bin exceeding the adaptive threshold and the bin that falls below the adaptive threshold; and determining a distance to an object in a field of view of a light-ranging system based on the marked peak location.

12. The single-pass method of claim 11, further comprising, in response to finding the bin that falls below the adaptive threshold, disabling peak tracking.

13. The single-pass method of claim 12, further comprising, in response to disabling peak tracking, continuing the ordered comparison of each bin with the adaptive threshold until finding another bin exceeding the adaptive threshold.

14. The method of claim 12, wherein enabling peak tracking comprises setting a flag to a peak-tracking value.

15. The method of claim 14, wherein disabling peak tracking comprises restoring the flag to an original value.

16. A method for operating a light-ranging system to identify peaks in a histogram, the method comprising:

emitting, by an optical source, optical pulses for light ranging;

detecting, by an optical receiver, photons;

outputting, by a time to digital converter, times of flight of photons detected by the optical receiver;

determining, using an ordered comparison, a first bin from a plurality of bins in the histogram that exceeds an adaptive threshold, each bin representing a photon count corresponding to a distance from the light-ranging system to an object in its field of view;

determining, by continuing the ordered comparison after determining the first bin, a second bin that falls below the adaptive threshold;

marking a peak location between the first bin and the second bin in response to a width identified as a quantity of bins between the first bin and the second bin exceeds a width threshold; and continuing the ordered comparison until each bin has been compared with the adaptive threshold once; and determining the distance to the object based on the marked peak location.

17. The method of claim 16, wherein the width is determined by incrementing a count initialized when finding the first bin and the second bin.

18. The method of claim 16, wherein the peak location is marked at a median location between the first bin and the second bin.

19. The method of claim 16, wherein the adaptive threshold is calculated using Ordered Statistics-Constant False Alarm Rate.

20. The method of claim 16, wherein the adaptive threshold is calculated for each bin.

* * * * *